United States Patent
Barnes (10) Patent No.: US 6,823,728 B1
(45) Date of Patent: Nov. 30, 2004

(54) SYSTEMS AND METHODS FOR MEASUREMENT OF TIRE PRESSURE

(76) Inventor: Elwood E. Barnes, 3266 Limestone Rd., Cochranville, PA (US) 19330

(*) Notice: Subject to any disclaimer, the term of this patent is extended or adjusted under 35 U.S.C. 154(b) by 44 days.

(21) Appl. No.: 10/386,205

(22) Filed: Mar. 11, 2003

Related U.S. Application Data
(60) Provisional application No. 60/363,470, filed on Mar. 12, 2002.

(51) Int. Cl.⁷ ............................................. G01M 17/02
(52) U.S. Cl. ....................................................... 73/146
(58) Field of Search ........................... 73/146; 152/151, 152/415, 450

(56) References Cited

U.S. PATENT DOCUMENTS

| | | |
|---|---|---|
| 2,051,042 A | 8/1936 | Hendel et al. |
| 2,126,327 A | 8/1938 | Hendel et al. |
| 2,313,156 A | 3/1943 | Kratt, Jr. |
| 2,663,009 A | 12/1953 | Finan |
| 3,715,720 A | 2/1973 | Jehle |
| 3,973,436 A | 8/1976 | Lenderman |
| 4,084,431 A | 4/1978 | Newby |
| 4,355,299 A | 10/1982 | Cook, Jr. |
| 4,539,650 A | 9/1985 | Griffin et al. |
| 4,570,691 A * | 2/1986 | Martus ..................... 152/332.1 |
| 4,630,470 A | 12/1986 | Brooke et al. |
| 5,289,718 A | 3/1994 | Mousseau |
| 5,396,817 A | 3/1995 | Rosensweig |
| 5,445,020 A | 8/1995 | Rosensweig |
| 5,537,090 A | 7/1996 | Thomas et al. |
| 5,753,810 A | 5/1998 | Bass |
| 5,942,681 A | 8/1999 | Vollenweider et al. |
| 5,962,779 A | 10/1999 | Bass |
| 6,094,979 A | 8/2000 | Haslett |
| 6,343,506 B1 | 2/2002 | Jones et al. |

* cited by examiner

Primary Examiner—William Oen
(74) Attorney, Agent, or Firm—Priest & Goldstein, PLLC (57) ABSTRACT

Techniques for determining, by external means, the internal pressure of a pneumatic tire. From fundamental relationships, pressure in a tire can be measured as a function of the weight on the wheel divided by area of the tire on the ground. Area and weight sensors can be configured into a low profile package or mat. As a vehicle is driven across the mat, the sensors extract weight and area information from each tire. Then a computational device calculates the tire pressure in each of the four tires of the vehicle and presents this information to the driver visually or aurally. Operation of the device is transparent to the driver, requiring him or her only to drive over or stop on the designated area containing the sensors.

45 Claims, 10 Drawing Sheets

SYSTEMS AND METHODS FOR MEASUREMENT OF TIRE PRESSURE

The present application claims the benefit of U.S. Provisional Application Ser. No. 60/363,470 filed Mar. 12, 2002, which is incorporated by reference herein in its entirety.

FIELD OF THE INVENTION

The present invention relates generally to systems and methods for externally determining the air pressure present in a pneumatic tire. More specifically, the present invention provides systems and methods for nonintrusively determining tire pressure for a vehicle utilizing sensors which extract the tire surface contact area and the weight supported by the tire to determine tire pressure.

BACKGROUND OF THE INVENTION

Typically, the pressure in a tire mounted on a vehicle is measured by attaching a pressure gauge or meter to the tire's air filling stem, allowing the internal pressure to be sampled. This technique has been used for many years and the cost of performing the measurement is small, but it suffers from several major disadvantages. For example, in attempting to make this direct pneumatic connection, air can be lost from the tire in attaching or removing the pressure gauge. Thus, unless special care is used with repeated testing, pressure will be lost from the tire. Hence, there may be a psychological reluctance on the part of the driver of the vehicle to test the tire. Many drivers may not feel comfortable using a tire gauge, may be reluctant to make a test in bad weather, or the like.

Other tire pressure measurement systems allow for on-board measurement and display of tire pressure. Sensors in or on the tires allow a display unit on the dashboard of a vehicle to present real time tire pressure for all four tires. Such an approach may suffer from several weaknesses, such as, increasing the amount of data with which drivers must contend while driving, distracting the driver from the more important job of driving the vehicle, presenting information when and where little can be done to correct an abnormal situation, complicating tire rotation, and increasing the cost of the vehicle.

SUMMARY OF THE INVENTION

The present invention provides systems and methods for externally determining the internal pressure of a vehicle tire without requiring a pneumatic connection to the tire or special hardware attached to the tire or vehicle. In one aspect, sensors may be disposed near gas pumps at a service station or other service area. As a vehicle passes over or stops on the sensors, the weight of the tire and the area of the tire in contact with the bearing surface are determined. From these measurements, the tire pressure can be determined. In this situation, low tire pressure can be addressed by a source of air normally present at most modern service stations. Further, service personnel are also typically present to deal with any tire problems or filling issues.

In one aspect, the measurement is transparent to a driver and presents the tire pressure information in a useful fashion during vehicle refueling. In another aspect, the sensors may be configured in a thin mat or envelope.

A more complete understanding of the present invention, as well as further features and advantages of the invention, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
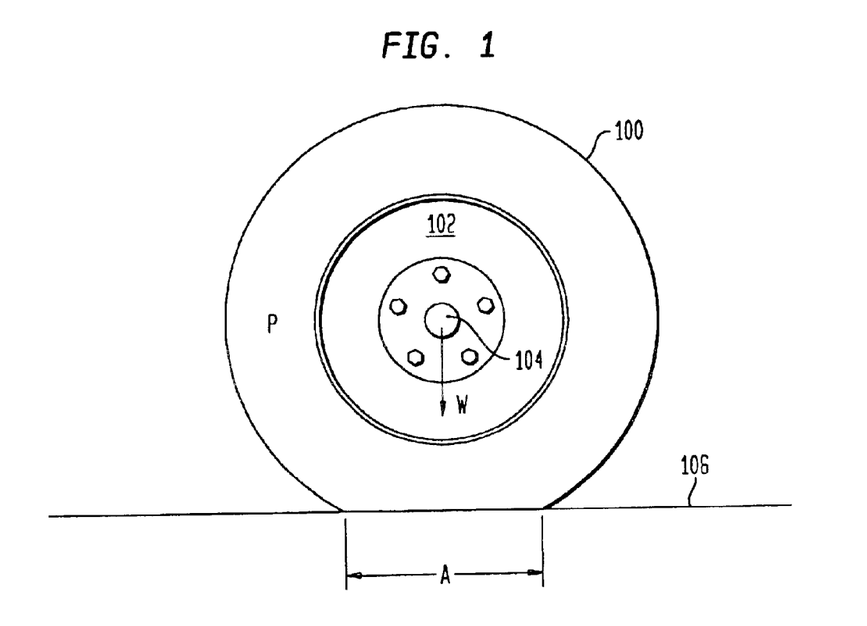
FIG. 1 shows a side view of a pneumatic tire to be tested in accordance with the present invention.

The present invention comprises systems and methods for externally determining the internal pressure of a vehicle tire without requiring that a pneumatic connection be made to the tire. The vehicle tire may be mounted on an automobile, truck, bicycle, aircraft, sport utility vehicle, or the like. In the following disclosure, the terms "wheel" and "tire" may be used interchangeably. While the air in a tire is what allows the weight of the vehicle to be borne, it is the wheel that transfers force to the axle of the vehicle. FIG. 1 shows a side view of a pneumatic tire 100 which may be suitably be tested utilizing the present invention. The tire 100, typically attached to a vehicle, is mounted on a wheel 102 attached to an axle 104. The tire contains air at pressure P and supports a weight W. An area A of the tire 100 is in contact with a load bearing surface 106. The pressure P is the same throughout the interior of the tire 100. These three variables can be related by the expression $W = \int P \times dA$. In other words, ignoring sidewall and non-linear peripheral effects, the weight W on the axle of the wheel is equal to the integral of a product having pressure P at each point of contact dA of the tire across the effective ground bearing area. If the weight on the wheel is assumed constant, and then if the pressure decreases, the area on the ground must increase. For example, as the pressure in the tire is halved, then the area on the ground doubles. The sides of the tire bulge to allow this contact area to be increased.

By making a first order assumption, the above equation can be simplified by considering the quantity A as a bulk quantity. P is already a constant. Thus, P and A can be measured separately and W can then be determined by the equation W=P×A. Given that the second order effects are small, this approximation appears to be substantially accurate. Taking the equation above and dividing through by the area A, we find that the pressure P can be separated such that, including constants and scaling, P=ƒ(W/A), where the function ƒ defines the pressure P as a function of the weight W on the wheel and area A of the tire on the ground. Ignoring compensations and reduced to the simplest form, it can be stated that P≈W/A.

Thus, by determining the weight W being borne by the wheel and determining the effective area A of the tire on the ground for that wheel, the pressure P of the tire mounted on that wheel can be determined. This measurement of course ignores sidewall effects, tread patterns, pressure activation thresholds, variations in area loading, end nonlinearities, and the like. While these higher order effects are present and some can be compensated for, they may be small enough to be ignored as far as practical measurements are concerned.

According to one aspect of the present invention, a tire pressure measurement technique operates in the following fashion to determine the pressure of a single tire. Two separate sensors are used. One sensor determines the weight W on the wheel under test while a second sensor determines the area A of the tire on the ground. The quotient, W/A, after scaling, suitable corrections and post processing, provides a measure of the pressure P in the tire.

Figure 2:
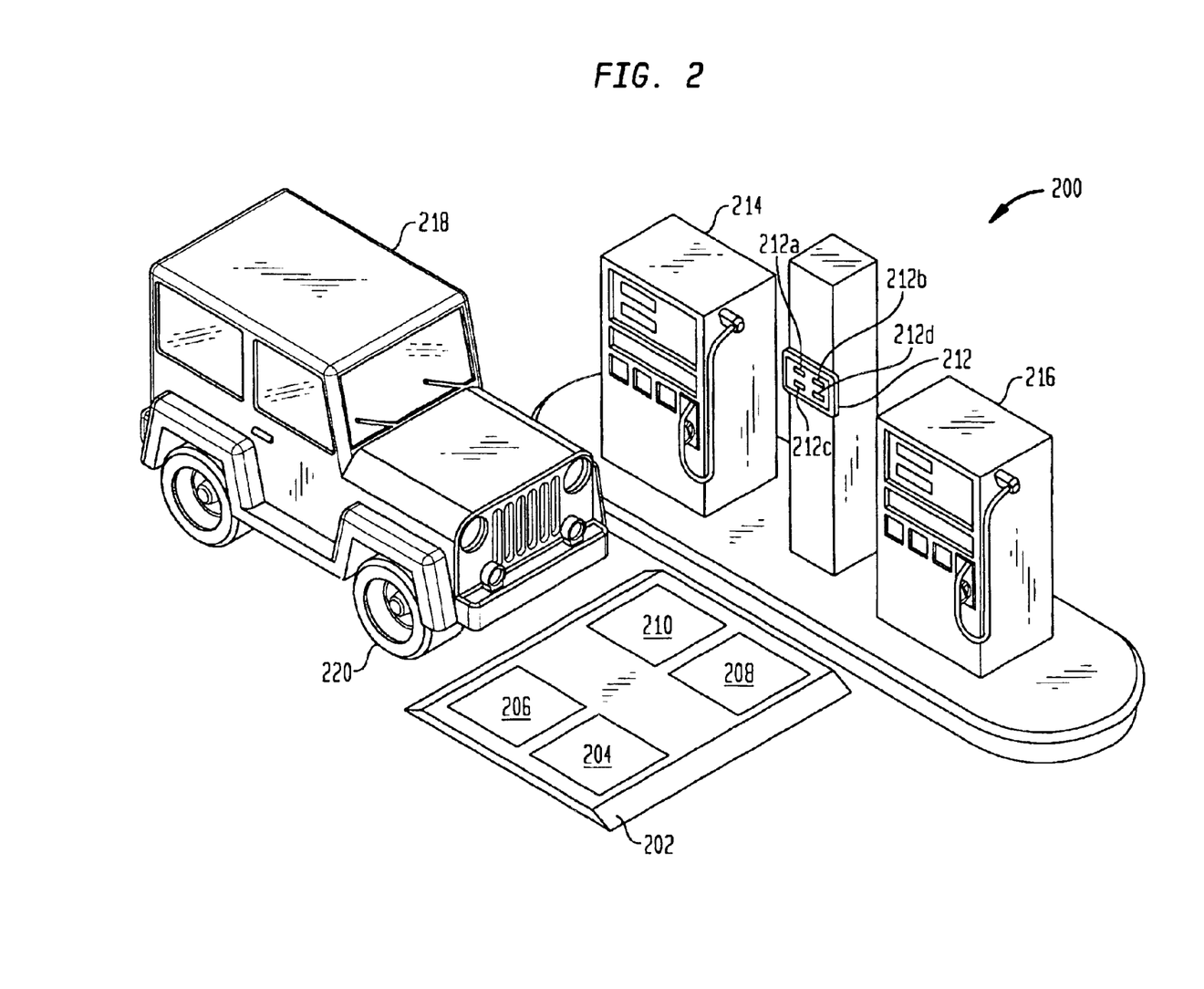
FIG. 2 shows a perspective view of a tire pressure measurement system in accordance with the present invention.

FIG. 2 shows a perspective view of a tire pressure measurement system 200 deployed near a service island of a service station in accordance with the present invention. In a presently preferred embodiment, two separate sensors located in tandem are used to make the required measurements for a given tire. As seen in FIG. 2, a mat 202 includes sensors 204, 206, 208 and 210. Sensors 204 and 208 measure the area of the tire contacting the ground while sensors 206 and 210 measure weight. A driver of a vehicle 218 simply drives the vehicle over mat 202 so that the tires pass over the sensors on the approach to one of the gas pumps 214 or 216. In the illustration shown in FIG. 2, the driver drives over mat 202 from left to right to reach pump 216. It will be recognized that the net effect is the same when driving from right to left to reach pump 214. Of course, multiple mats or some other arrangement of sensors could be deployed if desired. As the tire 220 passes over the mat, the sensor 206 determines the weight W on the wheel under test and the sensor 204 determines the area A of the tire 220 in contact with the ground. Their quotient, W/A, after scaling, suitable corrections and post processing, provides a measure of the pressure P in the tire. Similarly, for the other side of the vehicles the sensor 210 determines the weight W on the other front tire and the sensor 208 determines the area A of the tire in contact with the ground. Then, as the vehicle continues forward, the contact area and weight of the rear tires are separately determined in a like manner. Such a technique may also be adapted to determine the pressure of dual tires, such as the side by side pairs of tires frequently found on larger trucks.

The tire pressure information for each tire is then displayed on display 212 as the customer begins fueling. Alternately, the gas pumps 214 and 216 may display the tire pressure information. In one aspect, the tire pressure information may be symbolically displayed with only tires with potential problems highlighted. Alternatively, the information might be appear as a two-digit display for each of the four tires inside an outline of a vehicle. Any tire having, for example, unusually low pressure, perhaps less than 20 pounds, would cause a warning indicia, such as a flashing warning light, buzzing sound or combination of indicia, to gain the attention of the driver attempting to fill his vehicle. A voice message could also be annunciated: "Your left front tire is low!", for example. In this way, the driver would be alerted to the status of the pressure in each of his or her tires. If one or more tires required immediate attention, then a supply of compressed air is typically available at most stations to correct the problem. If the driver missed the active areas on the mat preventing a pressure determination from being made, then the display could display an indication of this failure, such as an "Insufficient Data" or "Repeat Measurement" message, for example. If the vehicle was traveling too fast, a related message may be presented.

As the sensors 204, 206, 208 and 210 are arranged in a tandem fashion, the direction of motion of the vehicle across the sensors may be determined without the need for additional sensors. Based on the direction of motion, a determination can be made as to which display should display the tire pressure information, if multiple displays can be used. For example, sub displays 212a, 212b, 212c and 212d could correspond to the tires of vehicle 218 as follows: 212d corresponds to tire 220, 212b corresponds to the other front tire, and 212a and 212c correspond to the rear tires. If the sensors are not arranged in a tandem fashion, such as the stacked arrangement described below with respect to FIG. 3, then one or more other sensors might be added to establish direction of motion.

The tire pressure information may also be printed on a sales slips generated the gas pumps 214 and 216. Fleet vehicle use might require that the tire pressure information be recorded and printed both locally and remotely, along with the vehicle number or identification (ID) number extracted from a bar code or radio frequency (RF) tag, or the like, attached to the vehicle. Such an approach would provide a simple and cost effective way to track driver compliance with safe tire inflation guidelines. Alternately, the tire pressure information could readily be wirelessly transmitted to a receiver in the vehicle and stored for later use.

The present invention advantageously provides techniques for externally determining the internal pressure of a vehicle tire without a pneumatic connection. Additionally, the present invention provides for externally determining the pressure of each of the tires on the vehicle separately. A tire pressure monitoring system of the present invention is easy for a driver to use and does not require any special skills on the part of the driver. Furthermore, the present invention presents potentially vital information when the driver is not distracted by driving the vehicle, but rather when the opportunity exists for him to address or correct abnormal tire pressure levels, such as during refueling, when compressors are available at most service stations to correct the most frequent tire problem, low air.

Figure 3:
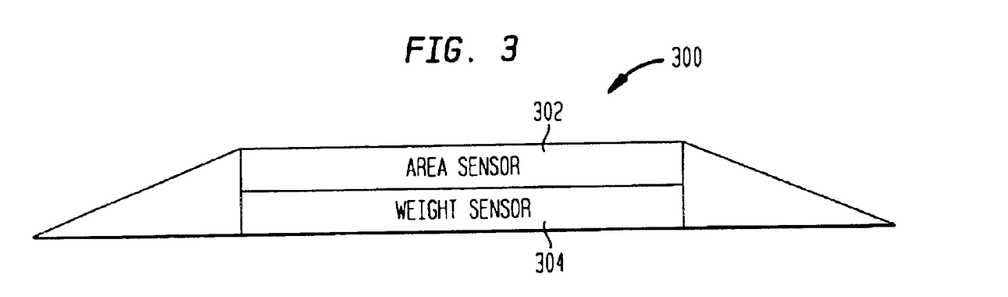
FIG. 3 shows a cross-sectional view of a tire pressure measurement system in accordance with the present invention.

In another aspect of the present invention, the weight and area sensors may be stacked, or incorporated together. As seen in FIG. 3, a tire pressure monitoring system 300 comprises an area sensor 302 placed vertically above a weight sensor 304. One stacked system 300 may be used for measuring the pressure of the left tires and a second stacked system 300 may be used for measuring the pressure of the right tires. The tire pressure monitoring system 300 may be advantageously used while air is being injected into the tire to display the information in real time, thus addressing many drivers' concerns about under or over inflating their tires. Utilizing an appropriate number of sensors, the present invention may also be used to determine the total weight of the vehicle while determining tire pressure, as may be required at a truck weigh station.

In one aspect, the area and weight sensors may be configured into a thin mat, as thin as 2 inches or less, resting on the surface of the forecourt of a service station to determine tire pressure. These sensors could be configured either with the sensors in tandem as shown in FIG. 2 or with one sensor stacked one above the other as shown in FIG. 3. A mat arrangement, as seen FIG. 2, for example, allows the deployment of the present invention without the necessity of digging up the forecourt of a service station. Further, the size of such a mat allows it to be moved temporarily in the case of snow plowing or resurfacing, and permits its movement to an alternative location as needed.

Figure 4:
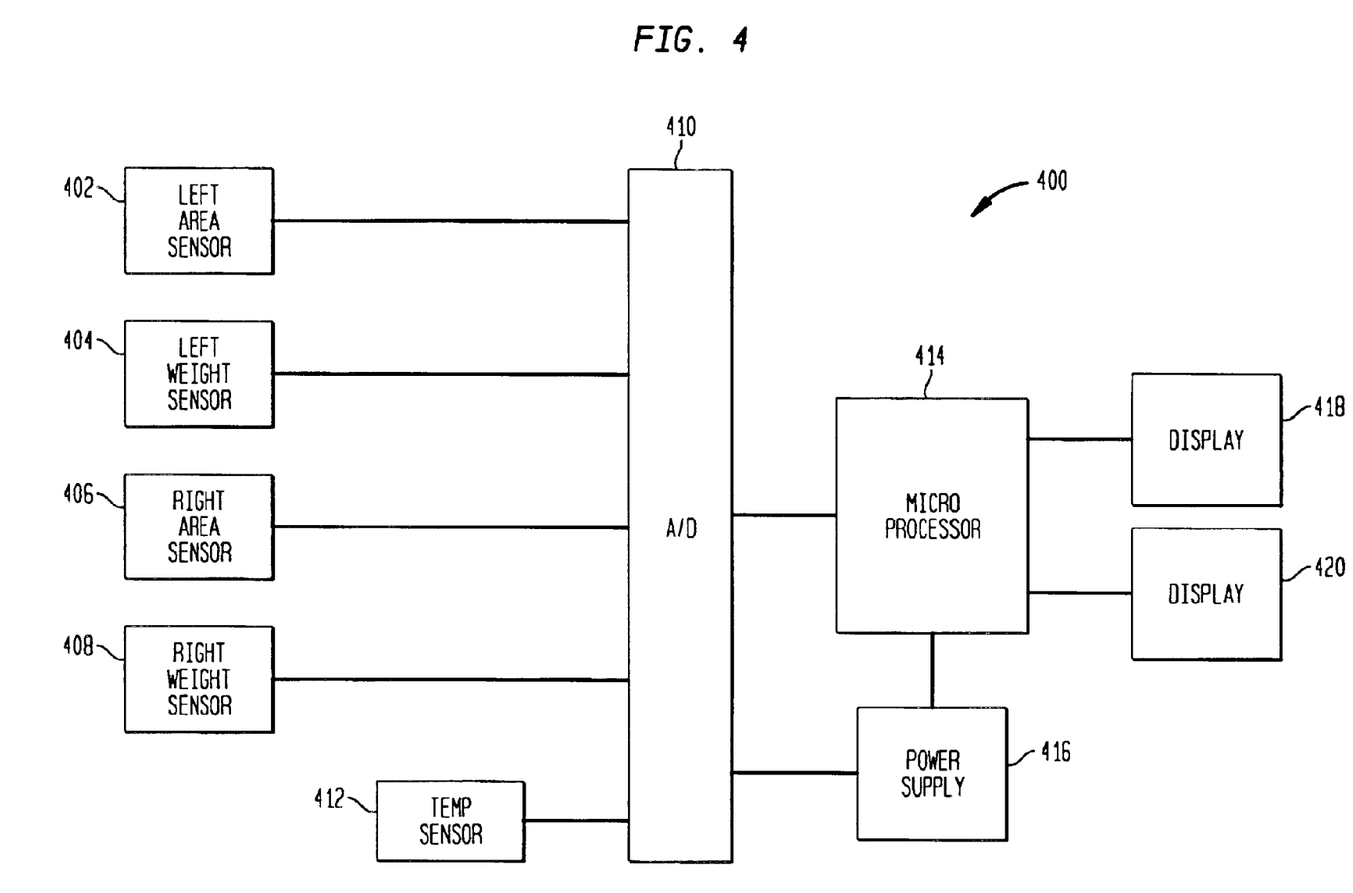
FIG. 4 shows a block diagram of a tire pressure measurement system in accordance with the present invention.

FIG. 4 shows a block diagram of an exemplary tire pressure system 400 in accordance with the present invention. A left area sensor 402 and a left weight sensor 404 measure data related to tire contact area and weight, respectively. These sensors are connected to an analog to digital (A/D) converter 410. The converter 410 may suitably comprise an 8 channel, 10-bit A/D converter, such as an LTC1293 A/D converter. A right area sensor 406 and a right weight sensor 408 measure tire contact area and weight, respectively, and are also connected to the analog to digital (A/D) converter 410. As a vehicle moves across the sensors, measurements of the contact area A and weight W of each tire are obtained from sensors 402, 404, 406 and 408 on both the left and right sides of the vehicle. Analog signals representing these area measurements are then passed to the A/D converter 410 which converts the analog signals to digital signals and transmits the digital signals to a microprocessor 414. The microprocessor 414 then determines the pressure P in each tire and displays the tire pressure on displays 418 and 420. A power supply 416 supplies power to the system 400. A temperature sensor 412 can be used to determine the ambient temperature at the site of system 400 to allow the microprocessor to take temperature into account when determining tire pressure.

Multiple techniques may be advantageously utilized in accordance with the present invention to measure the tire contact area and the weight supported by the tire. While four techniques for determining tire contact area are described below, the present invention is not so limited, and other techniques may also be utilized without departing from the teachings of the present invention.

A first technique, hereinafter referred to as the capacitance technique, determines the tire contact area A directly, without determining the width Wd or the length L of the tire tread. The capacitance technique produces a single number that reflects the area sensed at a single instance. In general, a parallel plate capacitor consists of two conductors separated by a non-conducting dielectric. The effective capacitance C for a parallel plate capacitor of area A is given by $C=eA/d$. The constant e is the dielectric constant of the material used between the plates and d is the separation of the plates.

Figure 5:
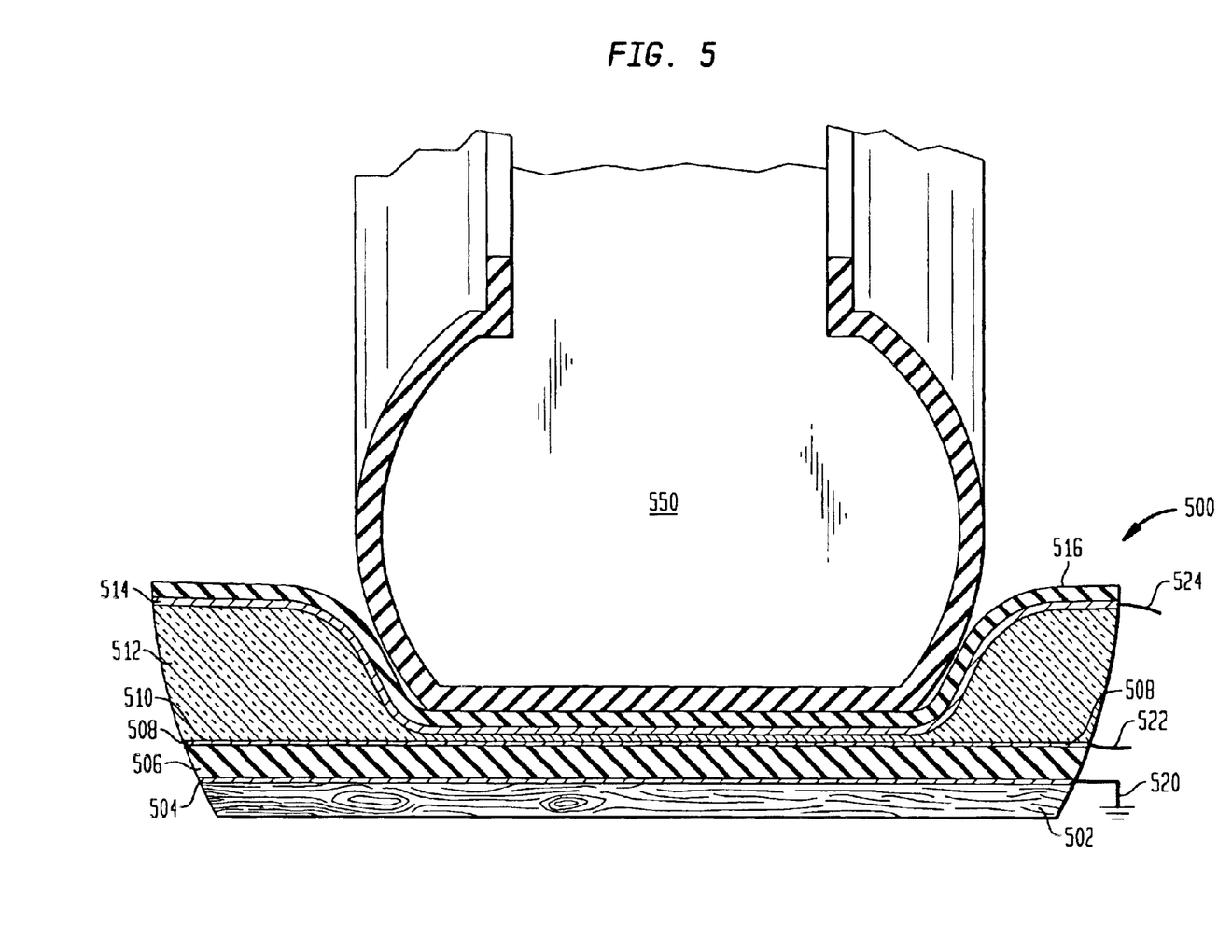
FIG. 5 shows a cross-sectional view of a capacitive area sensor in accordance with the present invention.

FIG. 5 shows a cross-sectional view of a capacitive area sensor 500 in accordance with one aspect of the present invention. Sensor 500 changes capacitance and this change is sensed to determine the tire contact area as described in further detail below. The sensor 500 may suitably comprise the following layers: a rigid structural base structure 502, a shield 504, a fixed insulator 506, a conductive lower capacitance plate 508, a solder mask 510, a compressible dielectric insulator 512, a flexible conductive upper capacitance plate 514, and a protection layer 516. The rigid base structure 502 may suitably comprise a structurally strong piece of non-conducting material, such as plywood, for example. Layers 504, 506, 508 and 510 may be constructed using printed circuit (PC) board techniques. In a preferred embodiment, the fixed insulator 506 comprises PC board substrate material, such as epoxy fiberglass, sandwiched between the shield 504 and lower capacitance plate 508, both of which may comprise conductive copper. The solder mask 510 comprises a non-conductive epoxy mixture that is selectively applied over the copper capacitance plate 508 by a silk screen or other suitable techniques to prevent electrical shorts or undesirable jumps between conductors. The solder mask 510 prevents any possible contact between the two conducting surfaces 508 and 514 when the weight of the tire thins the dielectric 512 as it passes. Non-conductive nylon screws may be used to attach the fixed insulator 506 to the base structure 502. The dielectric insulator 512 may suitably comprise a compressible acoustical foam, such as Foamex #87250 0.5 inch industrial foam. In one aspect, the insulator 512 should be a non-conducting, easily compressed material with little mechanical hystersis and fast compression recovery.

On top of the dielectric insulator 512 is disposed the flexible conductive upper capacitance plate 514, which may suitably comprise a conductive polyurethane, such as McMasters-Carr 8713K92. The plate 514 is shaped so as to allow flexing without the possibility of making contact with the lower conductive plate 508 during the passage of a tire. The protection layer 516 may suitably comprise a 0.125" thick overcoat sheet of neoprene rubber, such as McMasters-Carr 9455K44, to protect the sensor elements from being damaged by the passage of tires. While exemplary materials for the construction of the sensor have been disclosed, as would be understood by one skilled in the art, other materials can be used as long as required mechanical properties, stiffness and flexibility, as well as conductive, dielectric and insulating characteristics are met. An electrical lead 520 connects the shield 504 to signal ground. Electrical leads 522 and 524 connect the lower plate 508 and upper plate 514, respectively, to a capacitance to voltage converter described below in connection with the discussion of FIG. 6.

Turning now to the operation of capacitive sensor 500, a tire 550 compresses the dielectric element 512 between the two conductive plates 508 and 514 to effectively increase the capacitance of the sensor 500: The capacitance before, during and after the passage of the tire gives information to determine the area A of the tire, so long as the weight of the tire is above some pressure threshold. This threshold is determined by the stiffness of the capacitor plate 514, the dielectric material 512 and the overcoat layer 516 protecting both. This capacitive technique does not give directly the width Wd or length L of the tire tread on the ground, but measures the area A directly by determining the change in capacitance. The sensor 500 advantageously will provide area data both statically, while the tire is stationary, as well as dynamically, while the tire is moving.

As the dielectric 512 is suitably compressible and the upper capacitor plate 514 is flexible, there will be a relatively large increase in capacitance as the pressure of the tire presses the upper plate close to bottom plate over the contact footprint A. This large increases occurs because the d term in the denominator of the equation C=εA/d can become quite small as the tire passes. For example, with a dielectric thickness of 0.5 inches, the output capacitance can more than double from the rest state even through the tire footprint is but 6% of the sensor area. Hence a sensor like sensor 500 of FIG. 5 provides a sensitive measurement technique for determining area.

Figure 6:
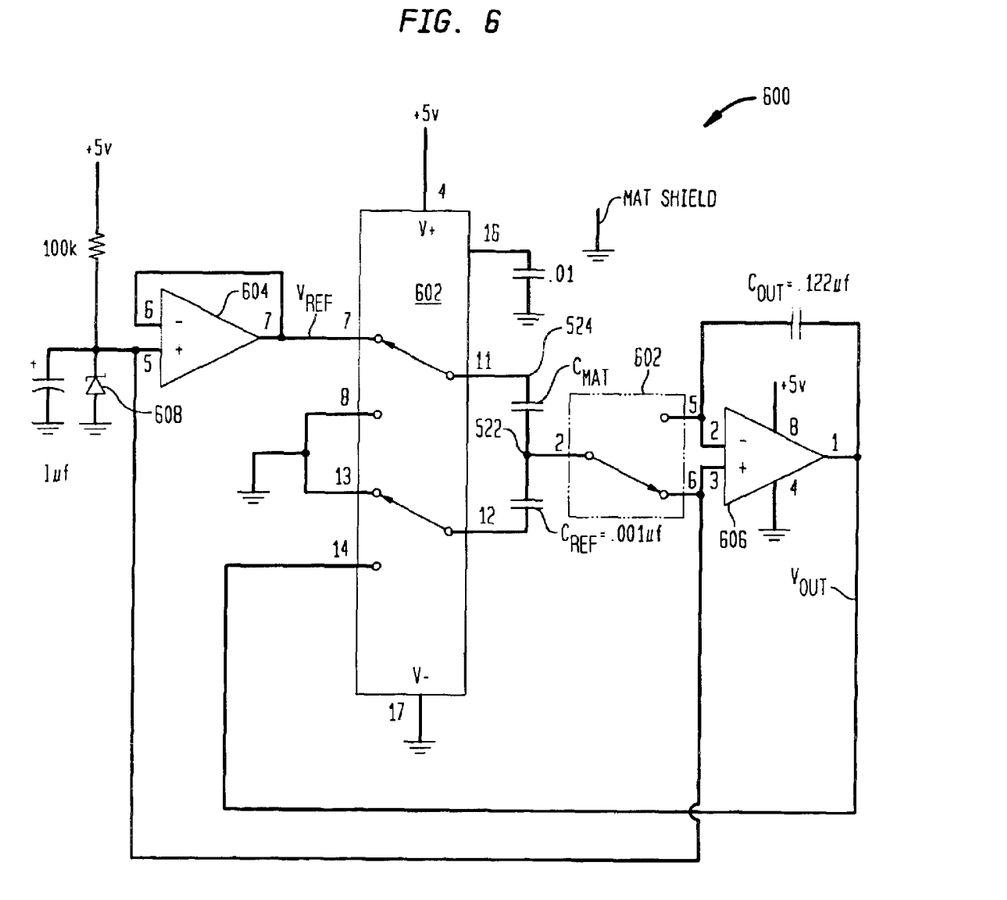
FIG. 6 shows a schematic diagram of a capacitance to voltage converter suitable for use in conjunction with the present invention.

FIG. 6 shows a schematic diagram of a exemplary capacitance to voltage converter 600 suitable for use in conjunction with the present invention. The capacitance to voltage converter 600 comprises a switched capacitor component 602, such as the LTC1043 produced by Linear Technology Corporation, and operational amplifiers 604 and 606, such as are contained in the LT1413 device also produced by Linear Technology Corporation. A zener diode 608, such as a LT1004-2.5 V, provides a reference voltage of 2.5 volts. For ease of reference, in the following discussion the pin numbers of a LTC1043 and a LT1413 are shown in FIG. 6. See Electronic Design, Nov. 4, 1996, pp 110–112, Jeff Witt, *Bridge Measures Small Caapacilance*, for more details of the circuit operation.

The two electrical leads 524 and 522 from the area sensor 500 are connected to between pins 2 and 11 of switched capacitor component 602. A range of output voltage for a given input capacitance is determined by a reference capacitor $C_{REF}$ that is connected between pins 2 and 12 of the switched capacitor component 602. In operation, a DC voltage $V_{OUT}$ appears at the output of the operational amplifier 606 that is proportional to magnitude of area sensor capacitance $C_{MAT}$ as well as the reference voltage $V_{REF}$. The magnitude of the output signal is also determined by the fixed reference capacitor $C_{REF}$. These relationships are $V_{OUT}=V_{REF}\times(C_{MAT}/C_{REF})$. This technique provides good noise and stray capacitance rejection. $V_{OUT}$ is fed into the input of the A/D converter 410 of FIG. 4 which converts the analog voltage into a digital number that is transferred to the microprocessor 414 that is handling the signal conversion.

The converter 600 produces a voltage output proportional to the capacitance of the capacitive area sensor 500 described above. Measurement of at rest, or inactive with no tire present, values of capacitance $C_{REST}$ are made and updated frequently. The values of delta capacitance, dC, obtained by determining $C_{CAR\ ON\ MAT}$ minus $C_{REST}$ allows one to determine the effective area produced by the tire by either a lookup table or by an explicit function, utilizing, for example, the microprocessor 414 described above. Calibration may be initially performed at time of fabrication and may later be updated through techniques of auto or self calibration. Further, the calibration may be modified by measurement of in situ temperature to compensate for variations due to temperature changes. Additionally, to compensate for potential drift caused by temperature, humidity, leakage, material set, and the like, an isolated element of the capacitor may be configured so as not to see any tire presence. To this end, a multiplexer at the input of the converter 600 would be included to allow either the normal sensor or this reference element to be read. Appropriate corrections can then be made to the area sensor values based upon any variation measured from the reference element.

Other techniques may be used to determine the capacitance of the sensor 500. For example, a capacitance to frequency converter as well as a capacitance bridge can be used to determine the capacitance of the area sensor. The capacitance bridge operates with an A/D converter as does the capacitance to voltage converter described above while the capacitance to frequency converter produces a digital signal that can be read directly and counted by the controlling microprocessor, perhaps with the aid of a prescalar.

A second contact area technique, also referred to as the line switch technique, determines the tire contact area A by determining the width Wd and the length L of the tire contact area. The line switch technique determines the contact area using a series of parallel pairs of line switches that are arranged both orthogonally and at two complementary angles to the direction of passage of the tire to be tested. A line switch is a switch whose contact area extends much further along one spatial dimension then the others. The line switch can be actuated, or closed, by applying pressure at any point along its length. In one example, two bare wires stretched side by side close together would make a line switch, and contact could be made between the two wires at any point along their length by simply pushing one wire against the other. A line switch could also be made by stretching a bare wire above and near a conductive copper plate. Pushing down on the wire anywhere along its length would make contact with the plate. Further details of line switch construction are addressed below.

Figure 7:
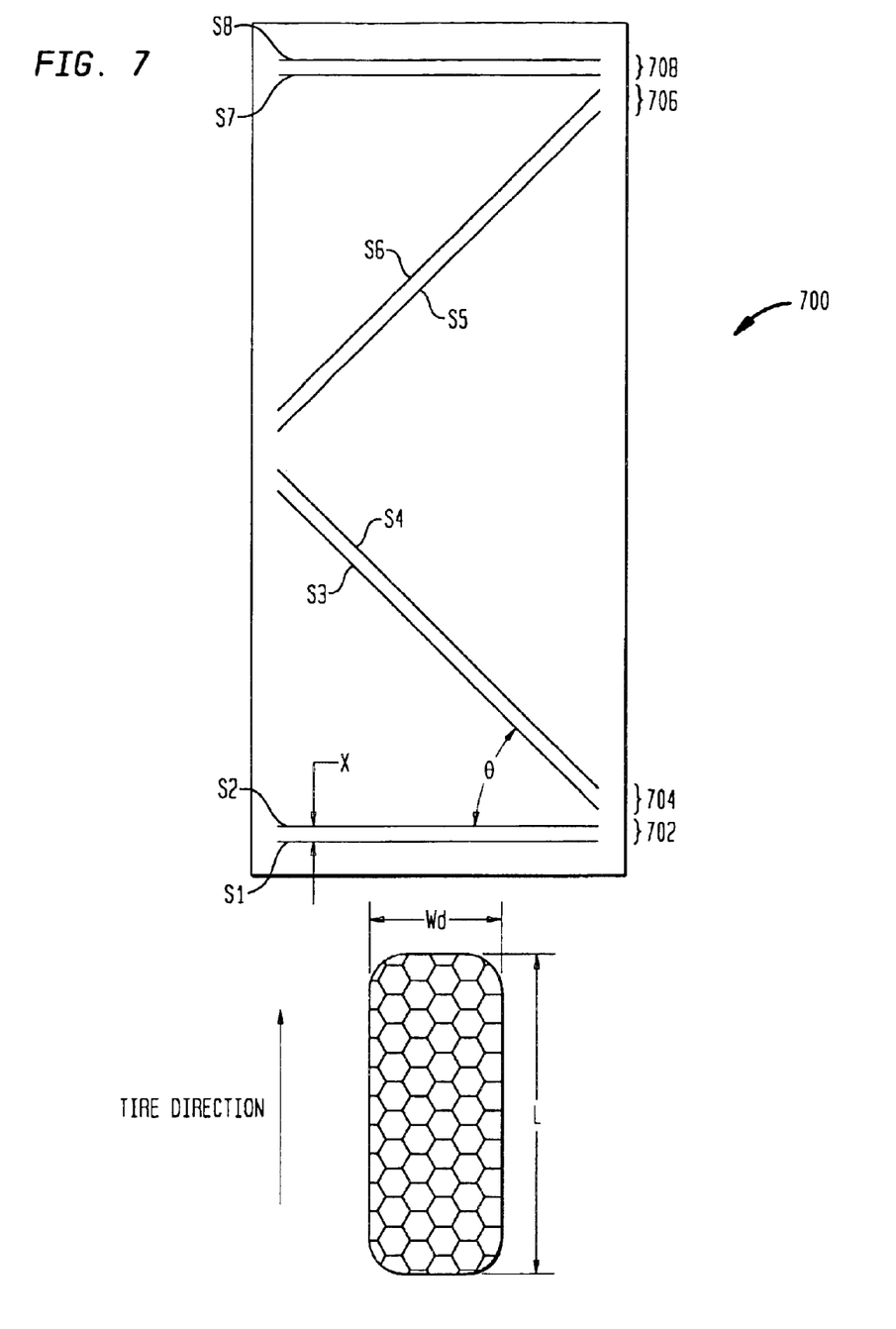
FIG. 7 shows an area sensor using line switch pairs to determine tire speed and the length and width of a tire tread in accordance with the present invention.

FIG. 7 shows a top view of a line switch area sensor 700 in accordance with the present invention. The line switch area sensor 700 comprises line switch pairs 702, 704, 706 and 708, which comprise line switches S1 and S2, S3 and S4, S5 and S6, and S7 and S8, respectively. Line switch pairs 702 and 708 are disposed in a parallel fashion in an orientation which is generally orthogonal to the tire vector, or the nominal path of the tire across the sensor 700. Switch pair 704 is disposed at an angle θ with respect to the normal (right angle) of the tire travel path or tire vector. The angle θ should not be parallel to the travel path of the tire and must be at an angle other than 90 degrees with respect to the travel path, such as 45 degrees, for example. Similarly, line switch pair 706 is disposed at an angle −θ with respect to the normal of the travel vector or the nominal path of the tire across the sensor. The switches are open until their contacts are forced closed by the pressure of a tire upon them, as described in greater detail below. Each switch of a switch pair is separated by a distance X.

Figure 8:
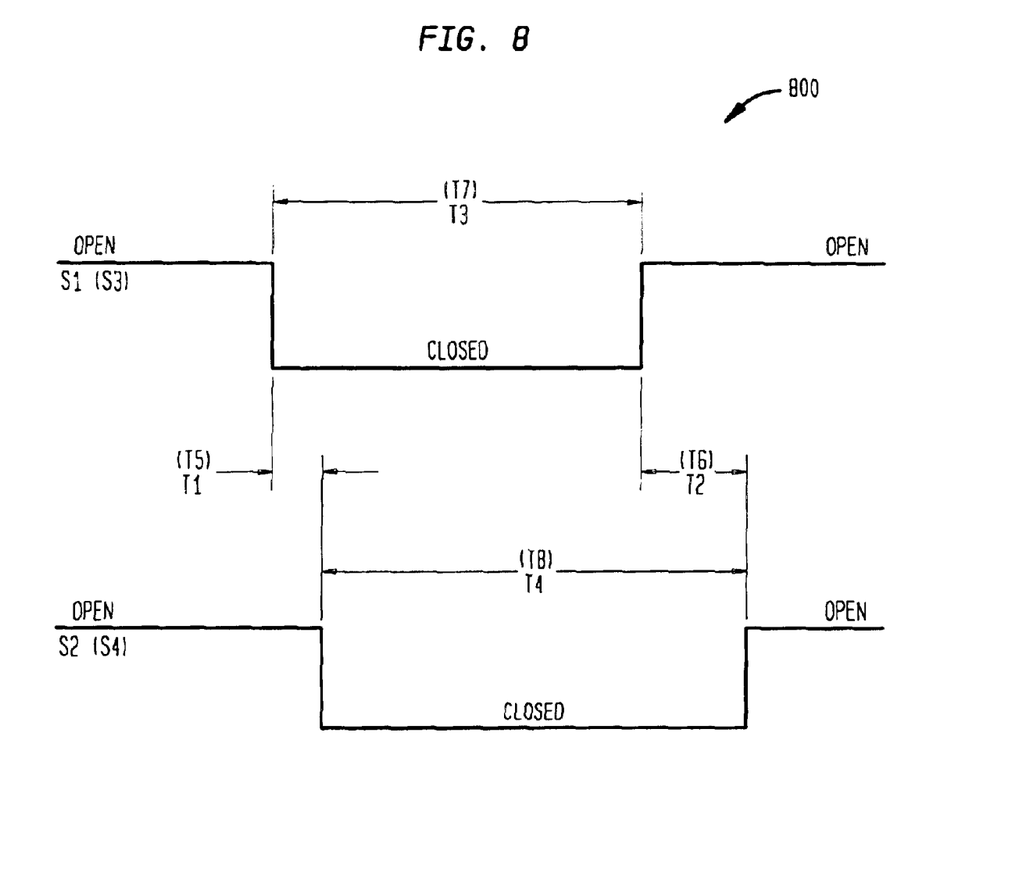
FIG. 8 shows a timing relationship diagram illustrating the opening and closing of line switches.

A line switch pair at a right angle or normal to the path of a tire, such as line switch pair 702, can provide four separate measurements based upon the time relationship between the opening and closing of each switch. FIG. 8 illustrates a line switch pair timing diagram 800 for line switch pairs 702 and 704 in accordance with the present invention. For ease of reference, the time values for the relationships of the line switch pair 702 are shown without parentheses in FIG. 8. The time values for the line switch pair 704 appear within parentheses. Assume the leading switch, the switch closest to the approaching tire and the first to be actuated by it, is S1, and that the trailing switch is S2. If one looks at the time delay resulting between the initial closing of S1 and that of S2 as T1, then the velocity of the leading edge of the tire $V_{Arrival}$, is then $V_{Arrival}=X/T1$. A microprocessor, such as microprocessor 414, can time the delay between the opening of switches S1 and S2 as the tire departs as well and obtain another velocity measurement. If the time between openings of the switches as the tire passes across each of the switches is T2, then the velocity of the trailing edge of the tire $V_{Exit}$ is equal to $V_{Exit}=X/T2$. Unless the vehicle on which the tire is mounted is accelerating or slowing, then $V_{Arrival}$ and $V_{Exit}$ should be the same. These two measurements can be averaged to reduce measurement error, used for compensation of velocity changes or can be compared to determine the validity of the measurement. Also, utilizing these measurements of velocity, the length of the tire tread on the ground can also be determined as follows. Assume that switch S1 is closed for a period of time T3 and the length of the tread on the ground as measured by S1 is $L_{S1}$, then, $L_{S1}=V\times T3$. Assume V is a constant and that $V=V_{Arrival}$. Then, $L_{S1}=V\times T3=(X/T1)\times T3$. A second measurement is possible for the tread length measured by the amount of time T4 that switch S2 is closed. This second measurement of length of tread using S2 or $L_{S2}=V\times T4$. Since V is also equal to $V_{Exit}$, then $L_{S2}=V\times T4=(X/T2)\times T4$. Note that the measures of $L_{S1}$ and $L_{S2}$ can be averaged to reduce error or can be used as a measurement flag to confirm the validity of the measurement. This measurement provides one of the dimensions of the area of the tire on the ground, the length L of the tread. Since modem tires tend to have approximately a rectangular footprint on the ground, the length provides one of the two necessary parameters that define the footprint or area of the tire. The tire length L can easily be obtained as described above by a pair of line switches, such as line switch pair 702, that are parallel to each other and at right angles to the path of travel of the tire.

Figure 9:
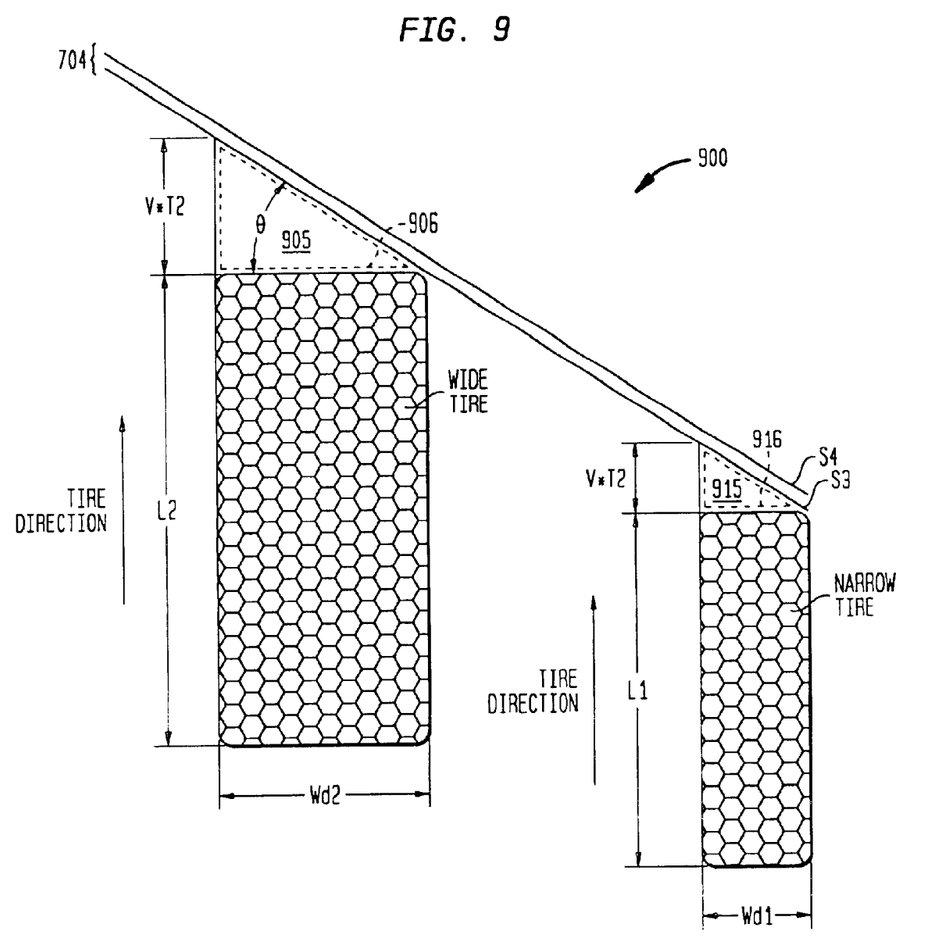
FIG. 9 shows tire width diagrams which illustrate aspects of tire width determination in accordance with the present invention.

Next, the effective tire width Wd is determined. FIG. 9 shows a tire width diagram 900 which illustrates aspects of this determination. Referring again to FIG. 8, the timing relationships between S3 and S4 are indicated within parentheses in that figure. The delay between the closing of switch S3 and when a passing tire closes S4 is designated T5. The delay in opening as the tire passes by between these two switches is designated T6. The length of time that S3 is closed is T7. The length of time that S4 is closed is T8.

In FIG. 9, tires of two different widths are shown just nearing switch S3 to illustrate the effect of tire width Wd on the measurement on T5–T8. If a line switch is orthogonal, or at right angles, to the travel vector, then the entire leading edge of a tire will cross the switch at the same instant whether the tire is wide or narrow. With a switch S3 at an angle θ to the normal of the travel vector, the leading edge of the tire does not pass the switch S3 at the same instant. Instead, the leading edge sweeps across the length of the switch S3 as it passes. Consequently, there is a marked difference for wide and narrow tires. It is possible to construct a triangle, such as triangle 905 or triangle 915 of FIG. 9, with an adjacent side, such as 906 or 916, equal to the width Wd of the tire. The opposite side of the triangle equals the velocity V of the tire $(=V_T)$ times the time $T_L$ for the leading edge of the tire to sweep across the switch. These terms can be related by the expression $\tan\theta=(V\times T2)/Wd=(V_T\times T_L)/Wd$. Thus, the time $T_L$ it takes the leading edge of the tire to pass or cross the first switch S3 is $T_L=(Wd\times(\tan\theta))/V_T$.

Now, assume that the tire has moved forward across S3 so that the leading edge is ready to leave S3. The amount of the time $T_T$ it takes for the length of the tire to pass across the switch S3 is simply the length of the tire L divided by the travel velocity $V_T$. The amount of time requires for the length of the tire to cross S1 is simply $T_T=L/V_T$. Hence, the total or composite time for the tire to pass over the leading switch S3 is the sum of these two times. $T_C=T_L+T_T$ or $T_C=((Wd\times(\tan\theta)/V_T)+(L/V_T)$. Wd can be solved for explicitly as follows: $Wd=(V_T/\tan\theta)(T_C-(L/V_T))=((V_T\times T_C)-L)/(\tan\theta)=((V_T\times T_C)-L)\times(\cot\theta)$.

The velocity $V_T$ of the tire at the angled line switch S3 can be determined by the time T1 it takes the leading edge of the tire to actuate the first switch S1 to the time it actuates the second switch S2. A known distance X separates these switches. Thus, $L=L_{S1}=V\times T_3=(X/T1)\times T3$. Hence, the explicit solution for the width of the tire using T1 and T2 to provide the length information to allow the solution of the width using T3 is: $Wd=((V_T\times T_C)-((X/T1)\times T3))\times(\cot\theta)$. Since, $V_T=V_{Arrival}=V_{Exit}=X/T1$ using switch S1 for velocity measurement: $Wd=((X/T1)\times T_C-((X/T1)\times T3))\times(\cot\theta)$ and thus $Wd=((X/T1)(T_C-T3))\times(\cot\theta)$. The total time or composite time $T_C$ is the amount of time that switch S3 is closed by the tire. This is a direct measurement. $T_C=T7$ and $Wd=((X/T1)(T7-T3))\times(\cot\theta)$. As all of these quantities are either directly measured or known, the width Wd of the tire can be directly calculated based upon measurements of the relationship between the closing and opening of the line switches S1, S2 and S3. This technique may also be used to determine the tire pressure of dual tires on vehicles.

Travel vectors that intersect the pair of switches at some angle other than θ, in other words, where the tire has not traversed the mat at right angles to S1-S2, can be corrected for. The two line switch pairs S3-S4 and S5-S6 allow any variation of the tire travel vector from the normal to S1 and S2 to be measured and compensated for, as the variations on either side of the tire travel vector will be different if there is deviation between the values obtained from the tire crossing S3-S4 from S5-S6. In this case θ, as seen by S3-S4, will be different than that observed by S5-S6. Thus, all of the quantities necessary to determine the tire length L and the tire width Wd can be calculated from direct measurements. These are supplied by the line switch pair S1-S2 at right angle to the nominal travel vector together with line switch pairs S3-S4 and S5-S6 that are at angles θ and −θ to the normal of the nominal travel vector. Angles that do not meet these requirements can be corrected for as long as the tire travel vector is such that the necessary switch pairs are crossed. Hence, with the two measurements of tire length, L and width Wd, the area A of the tire can be determined as a simple product with or without correction for corner rounding.

Note that after any angle corrections are made, the distance between line switch pair S3-S4 can be used to determine the velocity of the tire. Line switch pair S5-S6 can likewise provide this information. Line switch pair S7-S8 can be used to confirm exit velocity against the measurements from the line switch pair S1-S2. Variations from the nominal tire path across switch pairs S1-S2 and S7-S8 can be corrected for in a similar fashion.

In another aspect of the present invention, dual tires may be tested by using stepped or segmented sensors, with the latter technique using a series of smaller area sensors to determine area of the tire or tires at right angles to the direction of travel.

Figure 10:
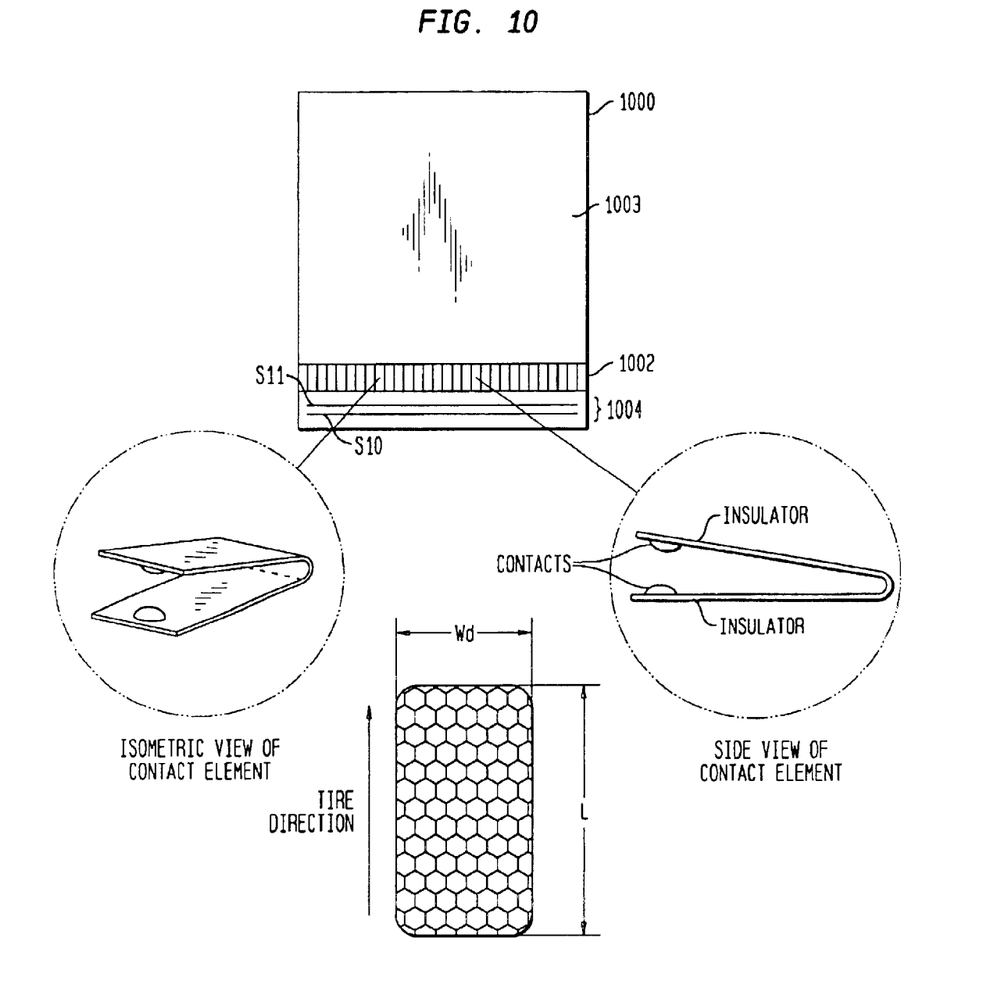
FIG. 10 shows a platform apparatus' for obtaining area and weight of a tire in accordance with the present invention.

A third technique for determining contact area, referred to as the linear switch array technique, determines the contact area A by integrating the width Wd of the tire as it passes over a sensor. The linear switch array is especially useful in dealing with single tires as well as dual tires. FIG. 10 shows a tire pressure sensor 1000 utilizing a linear switch array in accordance with the present invention. The tire pressure sensor comprises a dense row or linear array of switches 1002 and a weight sensor 1003. The switches 1002 are simple contacts arranged side by side, that produce an on or off signal. These switches 1002 are arranged in a row at a right angle to the nominal tire crossing path or travel vector. FIG. 10 also shows isometric and side views of the contact elements of these switches. Alternately, these switches may be fabricated as described below with respect to FIG. 11. By having an array of these simple switches arranged side by side, at densities up to 16 or more switches per inch and knowing tire velocity, provided by other sensors, such as a pair of line switches 1004 comprising individual line switches S10 and S11, the area of the tire is be obtained by integration. This technique is accomplished by scanning the states of these switches and generating a map of the tire's footprint, giving not only length L and width Wd, but also shape as well as area A. The array of these simple switches for a single tire might extend over 48 or more inches so as to allow measurements of both full sized trucks and sub-compact vehicles, as well as to allow for driver error in crossing the system. Use of microprocessor scanning and X-Y multiplexing makes such a system of 800 or more switches practicable since the scanning can take place in milliseconds The sensor 1000 is expandable so that the area of dual tires can be determined as well. Simple construction methods allow for the easy fabrication of such switches. Further techniques exist to reduce the computational overhead, such as, for example checking switch closures only on one inch centers during a period until the appearance of a tire is detected. Then, upon detection, sampling begins using all of the switches. Alternately, the line switch pair 1004, placed in front or trailing the array of switches 1002, can be used to detect the presence of a tire.

Velocity of the tire across the measuring surface can be accomplished by use of the line switch pair 1004 placed in parallel with the linear switch array. If S10 and S11 are separated by a distance X and the time between when the first switch contact is closed until the second is closed is time T, then the velocity V of the tire on the measuring surface is simply V=X/T.

Both S10 and S11 switch openings as well as closings can be used to determine velocity. Measurements can be made of velocity both as the tire arrives on the measuring surface, $V_{Arrival}$, as well the velocity of the tire when it exits, $V_{Exit}$. A determination can be made of the consistency of velocity or of any acceleration by comparing these two values and these velocity changes either averaged or if too much variation is apparent, the measurement can be invalidated. If the velocity variations are tolerable, as a tolerance can be determined based on criteria present in the microprocessor analyzing the data, then the velocity together with the map of the switch array closures versus time multiplied by the appropriate time intervals of closings allows one to determine not only the contact area A of the tire but also its shape. This same technique can allow dual tires to be individually measured.

Another technique for compactly determining weight is by the use of a fiber optics sensor deployed in a thin envelope. Both extrinsic and intrinsic embodiments may be utilized to determine both weight as well as area. See *Fiber Optic Sensors*, Udd, 1991, pp 2–3 for further details on fiber optic sensors. By way of example, in an extrinsic embodiment, light is transmitted into and out of sensor to reach the sensing region. In an intrinsic embodiment, environmental changes are converted to a light signal within the fiber. A fiber optic sensor is advantageous as it can be implemented in low profile configurations and produce signals using a number of the existing fiber optic sensing devices. One of these devices produces signals based on the micro bending of a light carrying fiber and the subsequent signal modification produced by an inner surface of two plates, one or both corrugated, moving towards each other by the weight of the tire. Evanescent coupling and sensing using prepared fiber offer other techniques of determining weight. Reflection and transmission fiber optics sensors offer yet additional options of measurement. These same techniques can be used to determine contact area of the tire. Further, these optical systems are immune to RFI and present no electrical spark danger when exposed to fuel or air mixtures.

Figure 11:
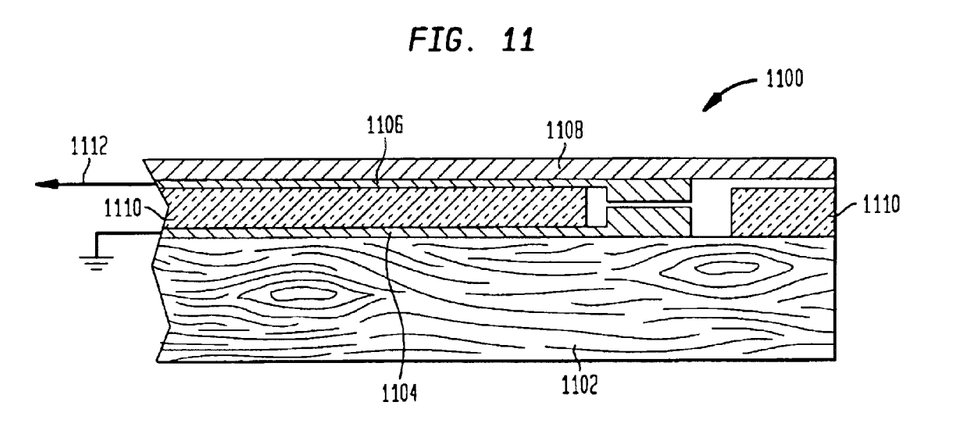
FIG. 11 shows a cross section of a sensing switch suitable for use in conjunction with the present invention.

FIG. 11 shows a cross-sectional view of a sensing switch 1100 in accordance with the present invention. In general, epoxy fiberglass material, such as that used in printed circuit board, or PC board material, is used extensively in the electronics industry to mount and position components and assemblies. Both linear switch arrays and line sensing switches may be fabricated in this fashion using PC board material. The construction is a sandwich made of an epoxy fiberglass material center, which is an insulator, with patterns of copper conductors or conducting areas on either surface. In order to restrict the presence of solder to locations where only connections to components are needed, a solder mask is used. A solder mask is a non-conductive epoxy mixture that is selectively applied over the surface of a PC board by a silk screen or other mechanism so as to prevent shorts or undesirable jumps between conductors and to provide insulation.

As seen in FIG. 11, a linear switch array 1100 comprises a PC board 1102 with a conductive copper upper surface 1104, acting as the bottom plate and switch common. The moving switch contact and interconnection to the switch will be functionally supplied by use of conductive patterns 1106 deposited on a flexible sheet 1108, such as Mylar™ sheeting, or some other suitable thin, non-conducting and flexible material with conductive patterns 1106, placed atop the PC board 1102. The conductive patterns 1106, a series of straight and narrow lines, allows a compact arrangement of these line switches to be fabricated with fixed and controlled dimensions and relationships. Contact between the inner surfaces of the copper surface 1104 and conductive patterns 1106 provide the switch function when the sheet 1108 is pressed down upon the copper of the PC board to provide a signal on lead 1112. The edge of the sheet 1108 constraining the switches can be slit orthogonally (90°) to the front edge so as to allow independent closure of adjacent switches without interaction between contacts, thereby increasing resolution. Conductive patterning on the conductor 1106 allows for electrical connection and hence dense fabrication of these switches. A specially shaped solder mask 1110 placed on the upper surface of the bottom plate prevents casual or rest contact between each pair of the two conductive faces, resulting in small patterned conductive areas on both surfaces that define the areas of contact. This solder mask 1110 supports the overcoat layer and other elements of the protective envelope preventing contact until sufficient force is applied to the upper contact conductor 1106 of the sheet 1108 to make contact with the lower surface 1104. Line switch pairs may also be fabricated in a similar fashion.

Figure 12:
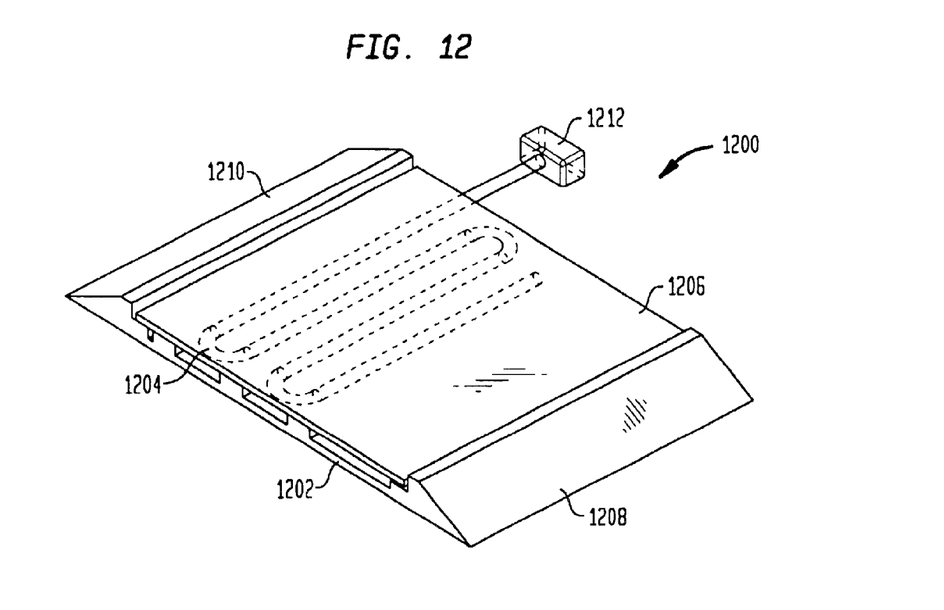
FIG. 12 shows a weight sensor using a fluid filled serpentine tubing in accordance with the present invention.

To determine the weight supported by a tire, a weight sensor or load cell may be utilized to determine the weight on the wheel under test. FIG. 12 shows a weight sensor 1200 in accordance with the present invention. A bottom plate or mounting frame 1202 holds a length of fluid filled, plastic tubing 1204 whose pressure was determined by pressure transducer 1212. The tubing 1204 holds an upper plate 1206 separate from the mounting frame 1202. As the tire passes over the upper plate 1206, the weight of the tire is borne by the fluid filled plastic tubing 1204 that is squeezed against the bottom plate, tending to flatten it to the extent of the weight bearing down upon it. Since the tubing 1204 is sealed, the pressure in the tubing 1204 will increase as the load upon it increases. The pressure transducer 1212 measures the internal pressure of the tubing 1204. The output of this pressure transducer is proportional to the weight presented to the upper plate.

The base of the breadboard load cell may be suitably constructed from ¾" plywood 60" by 24" in size. Ramps

1208 and 1210 are built on either side to smoothly raise the wheel of the vehicle onto the load bearing surface 1206. The load bearing surface may be a steel plate 3/8" thick by 36" by 18". A length of 3/4" outer diameter (OD) and 1/2" inner diameter (ID) PVC tubing, such as McMasters-Carr 5187K67 tubing, may pass beneath the load bearing surface four times at right angles to the direction of travel of the tire. In this way, a total of 72" of tubing passes beneath the load-bearing surface and supports it. In one aspect, the tubing 1204 may be constrained by U shaped copper retainers that are mounted on the base. These retainers together with channel sections of 1/4" by 1-inch wood strips transverse to the direction of path of the tires hold the tubing 1204 in place. The tubing 1204 may be filled with vegetable oil. The pressure transducer may suitably be a 0 to 30 psi millivolt output type pressure transducer, such as an Omega Engineering, Inc. PX236-030G, 0-30PSIG, 0–100 mv output transducer, that is attached to the PVC tubing via a T connection. This T connection allows the pressure sensor to determine the fluid pressure within the PVC tubing. The other side of the T connection has a quick release ball fitting that provides access to initially fill the tubing with fluid. The output of the pressure transducer bridge may be fed into a full differential amplifier. The output of the differential amplifier, which is preferably an operational amplifier with gain fixed and configured as a differential amplifier, provides a signal that is proportional to the weight of the tire on the weight sensor. In a prototype, a T1 TLC2654 operational amplifier was used for this differential amplifier The output of the differential amplifier is then fed into the input of an A/D converter, such as the A/D converter 410 of FIG. 4.

The output of the load cell is periodically measured to determine the non-loaded zero. When a tire passes over it, the output levels versus time are captured and from these captured levels the appropriate or peak value is determined. The zero or rest value is subtracted from the output readings. This difference value is then used to either directly compute the weight from a voltage to weight algorithm or else a lookup table is used. Note that both of these approaches are correctible for temperature variations. Drift and environment will determine which approach is better. As described above, temperature compensation can be utilized to minimize environment and system changes. Also, temperature sensing of the tire could be used to compensate for warm tires and hence calculate cold tire pressure.

Other techniques may be utilized to determine weight on the wheel of a vehicle. One method uses a load cell that is created by using one or more strain gauges attached to the upper most of two rigid plates described above but locked together at one end. The upper plate is allowed to bend and generate a signal proportional to the resulting deflection that is a measure of the weight on the ensemble. This is the deflected beam approach. Another approach allows one of the two plates to move vertically and the vertical motion is sensed by load cells or strain gauges. Yet another means of compactly determining weight is by use of a fiber optics sensor, as described above.

Once the weight W has been determined by the microprocessor from the raw data obtained from the weight cell and the area A has likewise been determined after processing the output of the area sensor, the pressure can be calculated, $P=f(W/A)$, where $f$ is used to define the pressure P as a function of weight on the wheel W and area A.

Combinations of some of the sensor types may be employed to provide additional data to correct for different tire construction, wheel diameter and sidewall heights. For example, tire width information can be used to provide additional criteria for corrections to the data obtained from the capacitance or other direct area measuring means. This tire width Wd information can be supplied by a row of simple switches, side by side, in a linear array before or after the direct area sensor. Here then, $P=f((W/A)(Wd))$.

A measure of the curvature of the sidewall, useful for pressure correction, can be obtained by use of two sets of parallel line switches, that have different activation thresholds. In other words, the two lines of switches are closed by two different weighs, where T0 and T1 are the closure times. Here then, $P=f((W/A)(T0,T1))$.

Further, two sets of parallel and adjacent line switches whose closure times and relationships can be used to estimate the tire length L footprint to supplement data obtained from an area sensor. Here then, $P=f((W/A)(T2, T3))$.

A composite mat consisting of two different dielectrics one atop the other or in tandem, and the two resulting measurements of capacitance, can be utilized to indicate sidewall curvature data as well as that of area. In this case, then $P=f(W/(A1, A2))$, where A1 and A2 arc the two separate area measures obtained.

In one aspect of the invention, a sensor may be utilized to initially determine wheel radius R. This information can then be used to supplement that obtained from the area and weight sensors. Here then, $P=f((W/A)(R))$.

To determine if the relationship $P=f(W/A)$ could be use to calculate tire pressure, a series of test were performed on five vehicles each having different tire sizes. The tested tires were: P176/70R13, P185/70R14, P185/65R14, P205/65R15 and P205/65R16. This range of tires provided a mix of three different tread widths, four different wheel sizes and two different sidewall/tread width ratios. A front tire and a rear tire for each of the above tire sizes were measured with the pressure in each tire changed incrementally from 39 psi to 21 psi in three pound steps. Weight measured on the tire under test ranged from slightly over 400 lbs to 975 pounds. Weight and area per tire were measured and used to calculate the pressure. The following expressions were used to make the calculation.

$$P_{uncorrected} = 52.68 \left[ 1/[[1964.5 dV/W]^{1.822} - 0.9916] \right]$$

$$P_{corrected} = [964.5/W]^{0.3} [P_{uncorrected}]$$

where W is the weight on wheel under test in pounds, and dV is the area measurement using change in capacitance shown in volts from wheel present to wheel absent.

A total of 70 data points resulted. Over this range (39 psi to 21 psi), 53 or 75% of the resulting calculated values were within plus or minus 10% of the pressure directly measured in the tires using a dial pressure gauge. 63 data points or 90% were within 15% or less of the directly measured values. Thus, based upon this data, it is believed that weight and area measurements as outlined above establish proof of the validity of the concept as providing a suitable mechanism for externally determining tire pressure. With improvements the test of concept prototype would be readily within the skill of those of ordinary skill in the art, it should be recognized that further improvements in the data would be obtainable.

Note that other mechanisms may be used to obtain area as well as weight on the wheel to supply needed information to perform the pressure determination of the tire under test.

While the present invention has been disclosed in a presently preferred context, it will be recognized that it may be readily applied in a variety of contexts consistent with the present teachings and the claims which follow.

I claim:

1. A system for determining the internal pressure of a pneumatic vehicular tire when mounted on a wheel of a vehicle comprising:
   a weight sensor that determines information relating to the weight being borne on the wheel;
   an area sensor that determines information relating to the footprint area of the tire; and
   a computation device which determines the weight utilizing the weight related information, the footprint area utilizing footprint area related information, and the internal pressure utilizing the footprint area and the weight.

2. The system of claim 1 further comprising:
   means for indicating the internal pressure of the tire.

3. The system of claim 2 wherein the means for indicating provides the internal pressure to a remote location.

4. The system of claim 1 wherein the weight sensor comprises a left weight sensor and a right weight sensor, and wherein the area sensor comprises a left area sensor and a right area sensor.

5. The system of claim 1 wherein the area sensor comprises a compressible dielectric capacitor that is compressed by the tire.

6. The system of claim 5 further comprising a detector for sensing the capacitance of the capacitor and producing a signal proportional to the capacitance of the capacitor.

7. The system of claim 6 wherein the signal is an output voltage signal proportional to the capacitance, a time value signal proportional to the capacitance or a frequency signal proportional to the capacitance.

8. The system of claim 5 wherein the compressible dielectric capacitor comprises a flexible upper plate and a fixed, thin protective insulating layer over an inner surface of a lower plate.

9. The system of claim 1 wherein the weight sensor comprises at least one strain gauge or at least one pressure sensor.

10. The system of claim 1 wherein said area sensors and weight sensors are located adjacent to a gas pump.

11. The system of claim 1 wherein said area sensors and weight sensors are at least partially vertically overlapping.

12. The system of claim 1 wherein the computation device determines the internal pressure of moving and stationary tires.

13. The system of claim 1 wherein the computation device utilizes at least one of: products, quotients, exponentiation, sampling, ratios, histogram, arithmetic averages, standard deviations, stored values with compensation of the results using environmental, speed, and aging conditions.

14. The system of claim 1 further comprising a means of inferring wheel radius R of the tire to supplement the determination of the internal pressure.

15. The system of claim 1 further comprising an apparatus for sampling tire width Wd using one or more linear arrays of side by side switches, said switches disposed at a right angle to a nominal tire passage vector and utilized to supplement the determined tire pressure.

16. The system of claim 1 further comprising one or more sets of parallel line switches near the area and weight sensors providing information to allow determining tire length L of the tire to correct the determined tire pressure.

17. The system of claim 1 wherein the area sensor comprises a plurality of parallel dual line switches.

18. The system of claim 17 wherein a first portion of the switches are generally orthogonal to the direction of the tire travel vector, a second portion of the switches are disposed at angle θ to the travel vector and a third portion of the switches are disposed at minus θ, wherein θ is an angle nonorthogonal and non parallel to the direction of the tire travel vector.

19. The system of claim 17 wherein the computation device comprises a microprocessor which determines the footprint based upon the closing and opening of the line switches as the line switches are activated by the passing of the tire.

20. The system of claim 19 wherein two pairs of adjacent and parallel line switches are used to determine, compensate and verify consistency of the tire velocity.

21. The system of claim 19 wherein one pair of adjacent and parallel line switches are used to determine the velocity of the tire and compensate or invalidate the measurement due to acceleration that can not be compensated for.

22. The system of claim 17 wherein the computation device determines the tire contact area by determining the length and width of the tire contact area.

23. The system of claim 17 wherein the timing of the opening and closing of a first line switch pair separated by a predetermined distance are utilized by the computation device to determine the velocity of the tire.

24. The system of claim 23 wherein the velocity of the tire and the timing of opening and closing of the first line switch pair are utilized by the computation device to determine the length of the tire.

25. The system of claim 24 wherein the timing of the opening and closing of the first line switch pair and the timing of the opening and closing of a first switch of a second line switch pair are utilized by the computation device to determine the width of the tire.

26. The system of claim 1 wherein the area sensor comprises of an array of closely spaced normally open switches.

27. The system of claim 26 wherein the outputs of the switches are multiplexed and scanned by external controlling means.

28. The system of claim 26 wherein upper contacts of the switches comprise a flexible insulating sheet including a conductive material as a contact to make up one pole of each switch.

29. The system of claim 28 wherein lower contacts of the switches comprise a conductive sheet, and contact is prevented between the upper and lower switch contacts by one of an insulating mask with openings over the contact area or by a solder mask on a bottom surface.

30. The system of claim 29 wherein a common opening on a conductive plate defines the lower contacts surface for each switch contact.

31. The system of claim 1 further comprising at least one reference element not affected by the passage of the tire to allow the computation device to compensate for environmental effects.

32. The system of claim 1 wherein the area sensor comprises a fiber optic sensor disposed under a detection area.

33. The system of claim 32 wherein the light output of said sensor depends on sensed contact area of the tire.

34. The system of claim 33 further comprising additional sensors operable to sense entrance and exit information of the tire on the detection area.

35. The system of claim 1 wherein the weight sensor comprises a fiber optic sensor disposed under the detection area.

36. The system of claim 35 wherein the light output of said sensor depends on the sensed weight of the tire.

37. The system of claim 36 further comprising additional fiber optic sensors operable to sense entrance and exit information of the tire on detection area.

38. The system of claim 1 wherein the computation device operates to determine the tire pressure of two tires of the vehicle.

39. The system of claim 1 further comprising a second weight sensor and a second area sensor.

40. A method for determining the internal pressure of a pneumatic vehicle tire comprising the steps of:

determining the footprint area of the tire;

determining the weight supported by the footprint area; and automatically determining the internal pressure of the tire utilizing the determined weight and the determined footprint area.

41. A system for determining the internal pressure of a pneumatic vehicular tire comprising:

a sensor measuring the weight W supported by the tire and the footprint area A of the tire; and a computation device determining the internal pressure P utilizing the weight and the footprint area.

42. The system of claim 41 further comprising:

means for reporting the internal pressure of the tire.

43. The system of claim 41 wherein the computation device performs the computation $P=f(W/A)$.

44. A system for determining tire pressure comprising:

a first apparatus for acquiring data related to the both the weight supported by and the footprint area of tires on the left side of a vehicle;

a second apparatus for acquiring data related both the weight supported by and the footprint area of tires on the right side of the vehicle; and a computing apparatus for determining the internal pressure of each of the tires by determining the weights and the measured footprint areas of each tire.

45. The system of claim 1 further comprising an apparatus for supplying supplemental tire width information utilizing a thin capacitance sensor orthogonal to the tire travel vector.

* * * * *